United States Patent
Ryu (10) Patent No.: US 11,145,879 B2
(45) Date of Patent: Oct. 12, 2021

(54) METHOD AND SYSTEM FOR ESTIMATING AND CONTROLLING WATER CONTENT OF FUEL CELL

(71) Applicants: HYUNDAI MOTOR COMPANY, Seoul (KR); KIA MOTORS CORPORATION, Seoul (KR)

(72) Inventor: Jung Hwan Ryu, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 26 days.

(21) Appl. No.: 16/209,310

(22) Filed: Dec. 4, 2018

(65) Prior Publication Data

US 2020/0112038 A1 Apr. 9, 2020

(30) Foreign Application Priority Data

Oct. 5, 2018 (KR) .................. 10-2018-0119276

(51) Int. Cl.
*H01M 8/04029* (2016.01)
*H01M 8/04858* (2016.01)
*H01M 8/0432* (2016.01)
*H01M 8/04007* (2016.01)

(52) U.S. Cl.
CPC ... *H01M 8/04029* (2013.01); *H01M 8/04037* (2013.01); *H01M 8/04358* (2013.01); *H01M 8/04925* (2013.01)

(58) Field of Classification Search
CPC ........ H01M 8/04029; H01M 8/04037; H01M 8/04358; H01M 8/04925
See application file for complete search history.

(56) References Cited

U.S. PATENT DOCUMENTS

2015/0349360 A1* 12/2015 Hoshi ............... H01M 8/04619
429/429

FOREIGN PATENT DOCUMENTS

| EP | 1923943 A1 | 5/2008 |
|----|-----------|--------|
| JP | 5310738 B2 | 7/2013 |
| JP | 5459223 B2 | 1/2014 |
| KR | 10-0966226 B1 | 6/2010 |
| KR | 10-2019-0047822 A | 5/2019 |

* cited by examiner

*Primary Examiner* — Olatunji A Godo
(74) *Attorney, Agent, or Firm* — Morgan, Lewis & Bockius LLP (57) ABSTRACT

A water content estimation method includes: measuring, by a temperature sensor, the temperature of coolant for cooling a fuel cell stack; calculating, by a water content calculator, a current heat capacity of the fuel cell stack based on the measured temperature of coolant; and estimating, by the water content calculator, a water content of the fuel cell stack based on the calculated current heat capacity of the fuel cell stack.

12 Claims, 4 Drawing Sheets

METHOD AND SYSTEM FOR ESTIMATING AND CONTROLLING WATER CONTENT OF FUEL CELL

CROSS-REFERENCE TO RELATED APPLICATION

This application claims the priority benefit of Korean Patent Application No. 10-2018-0119276, filed on Oct. 5, 2018 in the Korean Intellectual Property Office, the disclosure of which is incorporated herein by reference.

TECHNICAL FIELD

The present disclosure relates to a method and system for estimating and controlling a water content of a fuel cell, and more particularly, to a technology of estimating a water content of a fuel cell stack and controlling the fuel cell based on the estimation.

BACKGROUND

A fuel cell is a kind of power generation device that directly converts chemical energy, generated by oxidation of fuel, into electrical energy. Like a chemical cell, a fuel cell uses oxidation and reduction reactions. However, unlike a chemical cell, which is configured such that a cell reaction occurs in a closed system, a fuel cell is configured such that reactants are continuously supplied from the outside and a reaction product is continuously removed from the system to the outside.

In recent years, a fuel-cell power generation system has been commercialized. Since the reaction product of a fuel cell is pure water, studies on the use of fuel cells as energy sources for environment-friendly vehicles have been actively conducted.

A fuel cell stack, in which the chemical reaction of the fuel cell occurs, contains moisture. In order to activate the chemical reaction, an appropriate amount of moisture needs to be maintained inside the fuel cell stack. When the amount of moisture is insufficient, dry-out occurs, by which a membrane-electrode included in the stack is deteriorated. When the amount of moisture is excessive, flooding occurs, which obstructs activation of the chemical reaction.

Therefore, it is essential to control a fuel cell such that the water content of the fuel cell stack is maintained at an appropriate level in order to improve the power generation performance and durability of the fuel cell stack. Thus, technology of accurately estimating the water content of the fuel cell stack is required.

In the related art, the water content is estimated by measuring the output current, internal pressure, temperature, and humidity of the fuel cell using various sensors. However, according to this estimation method, both the initial value and the variation of the water content must be calculated in order to estimate the current value of the water content. In addition, a complicated preliminary experiment is required in order to derive the initial value of the water content. Therefore, there has been demand for a technology of directly and simply estimating the water content of the fuel cell stack.

The information disclosed in this Background section is only for enhancement of understanding of the general background of the disclosure and should not be taken as an acknowledgement or any form of suggestion that this information forms the prior art already known to a person skilled in the art.

SUMMARY

The present disclosure has been made in view of the above problems, and it is an object of the present disclosure to provide a technology of estimating the water content of a fuel cell stack by estimating the specific heat of the fuel cell stack using a difference between an inlet temperature and an outlet temperature of a coolant for cooling the fuel cell stack.

In accordance with an aspect of the present disclosure, a water content estimation method for a fuel cell method includes: measuring, by a temperature sensor, the temperature of coolant for cooling a fuel cell stack; calculating, by a water content calculator, a current heat capacity of the fuel cell stack based on the measured temperature of coolant; and estimating, by the water content calculator, a water content of the fuel cell stack based on the calculated current heat capacity of the fuel cell stack.

In the measuring the temperature of the coolant, a coolant inlet temperature, which is a temperature of a coolant that is introduced into the fuel cell stack, and a coolant outlet temperature, which is a temperature of a coolant that is discharged from the fuel cell stack, may be measured.

In the calculating the current heat capacity of the fuel cell stack, the current heat capacity of the fuel cell stack may be calculated using a heat exchange rate between the fuel cell stack and the coolant, a heating value of the fuel cell stack and a variation in temperature of the fuel cell stack.

The variation in temperature of the fuel cell stack may be estimated using a variation in a coolant outlet temperature measured in the measuring the temperature of the coolant, the coolant outlet temperature being a temperature of a coolant that is discharged from the fuel cell stack.

In the estimating the water content of the fuel cell stack, a mass of water contained in the fuel cell stack may be estimated on the assumption that the sum of an initial heat capacity in the state in which moisture is not contained in the fuel cell stack and a heat capacity of water currently contained in the fuel cell stack is the calculated current heat capacity of the fuel cell stack.

The method may further include, after the estimating the water content of the fuel cell stack, adjusting, by a cooling controller, the water content of the fuel cell stack by controlling the temperature of the fuel cell stack based on the estimated water content of the fuel cell stack.

In the adjusting the water content of the fuel cell stack, a target value of a coolant inlet temperature may be changed based on the estimated water content of the fuel cell stack, the coolant inlet temperature being a temperature of a coolant that is introduced into the fuel cell stack.

In the adjusting the water content of the fuel cell stack, when the estimated water content of the fuel cell stack is greater than an upper limit value, the target value of the coolant inlet temperature may be increased, and when the estimated water content of the fuel cell stack is less than a lower limit value, the target value of the coolant inlet temperature may be decreased.

In the adjusting the water content of the fuel cell stack, when the estimated water content of the fuel cell stack is within a normal range between an upper limit value and a lower limit value, a variation in the target value of the coolant inlet temperature may be set to 0.

In the adjusting the water content of the fuel cell stack, a variation in the target value of the coolant inlet temperature may be increased or decreased in proportion to a difference between the estimated water content of the fuel cell stack and the upper limit value or the lower limit value.

In the adjusting the water content of the fuel cell stack, a variation in the target value of the coolant inlet temperature may be fixed to a fixed value.

In the adjusting the water content of the fuel cell stack, a varied target value of the coolant inlet temperature may be limited within a normal target range.

In accordance with another aspect of the present disclosure, a water content estimation system for a fuel cell includes: a fuel cell stack; a cooler for circulating coolant for cooling the fuel cell stack; a temperature sensor for measuring the temperature of coolant in the cooler; and a water content calculator configured to calculate a current heat capacity of the fuel cell stack based on the temperature of coolant measured by the temperature sensor, and to estimate a water content of the fuel cell stack based on the calculated current heat capacity of the fuel cell stack.

The water content calculator may calculate the current heat capacity of the fuel cell stack using a heat exchange rate between the fuel cell stack and the coolant, calculated using a flow rate of the coolant supplied to the fuel cell stack from the cooler, and a heating value of the fuel cell stack.

The water content calculator may estimate a mass of water contained in the fuel cell stack on the assumption that the sum of an initial heat capacity in the state in which moisture is not contained in the fuel cell stack and a heat capacity of water currently contained in the fuel cell stack is the calculated current heat capacity of the fuel cell stack.

The system may further include a cooling controller configured to adjust the water content of the fuel cell stack by controlling the cooler based on the water content of the fuel cell stack estimated by the water content calculator.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms and should not be construed as being limited only to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent" etc.).

The terminology used herein is for the purpose of describing particular embodiments only and is not intended to be limiting of exemplary embodiments of the disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
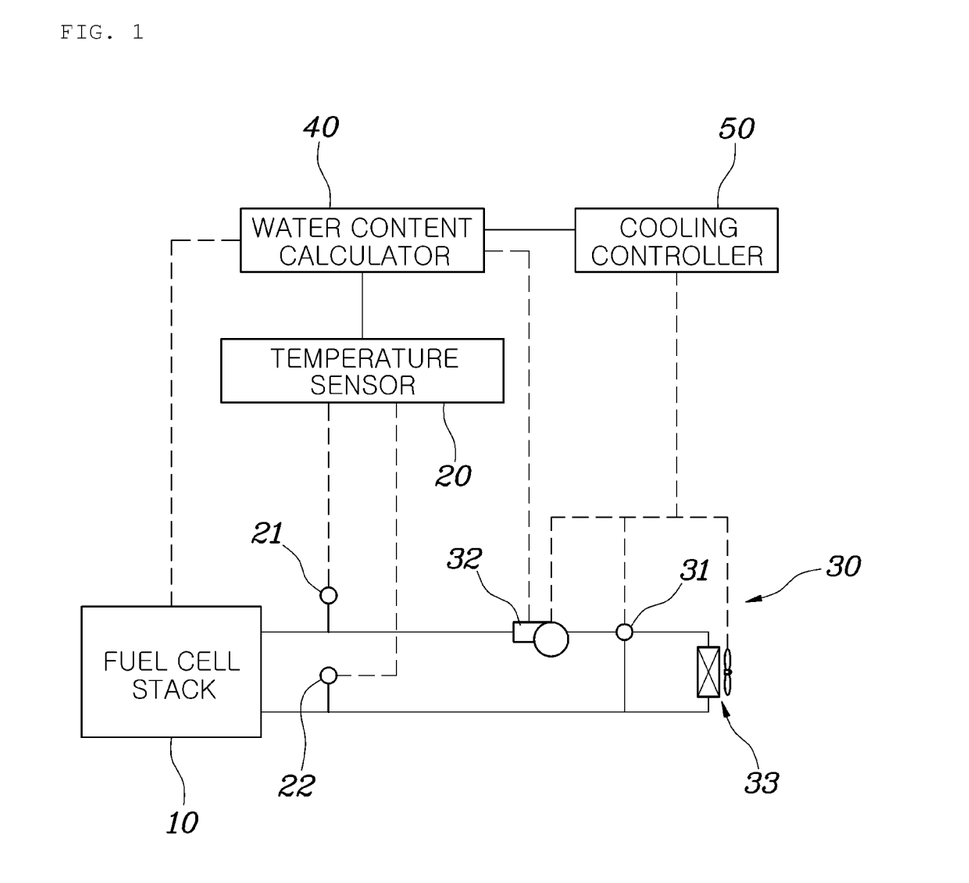
FIG. 1 is a view showing the constitution of a water content estimation system for a fuel cell according to an embodiment of the present disclosure.

FIG. 1 is a view showing the constitution of a water content estimation system for a fuel cell according to an embodiment of the present disclosure.

Referring to FIG. 1, a water content estimation system for a fuel cell according to an embodiment of the present disclosure includes a fuel cell stack 10, a cooler 30 for circulating coolant for cooling the fuel cell stack 10, a temperature sensor 20 for measuring the temperature of the coolant in the cooler 30, and a water content calculator 40 for calculating the current heat capacity of the fuel cell stack 10 based on the temperature of the coolant measured by the temperature sensor 20 and estimating the water content of the fuel cell stack 10 based on the calculated current heat capacity of the fuel cell stack 10.

The fuel cell stack 10 receives hydrogen and oxygen through a hydrogen electrode and an air electrode thereof, and generates electric power through a chemical reaction. While electric power is generated by a chemical reaction, heat is also generated in the fuel cell stack 10.

The cooler 30 circulates coolant to remove heat from the fuel cell stack 10. The cooler 30 includes a cooling pump 32 for circulating coolant to a cooling circuit connected to the fuel cell stack 10, a heat-dissipating device 33 for dissipating heat from the coolant in the cooling circuit, and an electronic thermostat 31 for controlling the flow rate at which the coolant discharged from the fuel cell stack 10 passes through or bypasses the heat-dissipating device 33. Here, the heat-dissipating device 33 may be a heat sink.

The temperature sensor 20 measures the temperature of the coolant. Respective temperature sensors 21 and 22 for measuring the temperature of the coolant may be installed at a position 21 through which the coolant flows before entering the inlet of the fuel cell stack 10 and at a position 22 through which the coolant discharged from the outlet of the fuel cell stack 10 flows. That is, the temperature sensor 20 may measure the coolant inlet temperature, which is the temperature of the coolant that is introduced into the fuel cell stack 10, and the coolant outlet temperature, which is the temperature of the coolant that is discharged from the fuel cell stack 10, using the temperature sensors 21 and 22.

The water content calculator 40 may calculate the current heat capacity of the fuel cell stack 10 based on the temperature of the coolant measured by the temperature sensor 20, and may estimate the water content of the fuel cell stack 10 based on the calculated current heat capacity of the fuel cell stack 10. The concrete estimation method will be described later.

The water content estimation system for a fuel cell according to the embodiment of the present disclosure may further include a cooling controller 50 for adjusting the water content of the fuel cell stack 10 by controlling the cooler 30 based on the water content of the fuel cell stack 10 estimated by the water content calculator 40. Here, the cooling controller 50 may be a processor (CPU) or more specifically an electronic control unit (ECU) for controlling various electrical systems in a vehicle. For example, the water content calculator 40 may be controlled by the cooling controller 450 to perform the functions thereof, or embedded in the cooling controller 50 as one controller.

The cooling controller 50 may control the temperature of the fuel cell stack 10 by controlling the cooling pump 32, the heat-dissipating device 33 and the electronic thermostat 31, which are included in the cooler 30. In particular, the water content of the fuel cell stack 10 may be adjusted by controlling the cooler 30 based on the water content of the fuel cell stack 10 estimated by the water content calculator 40.

Figure 2:
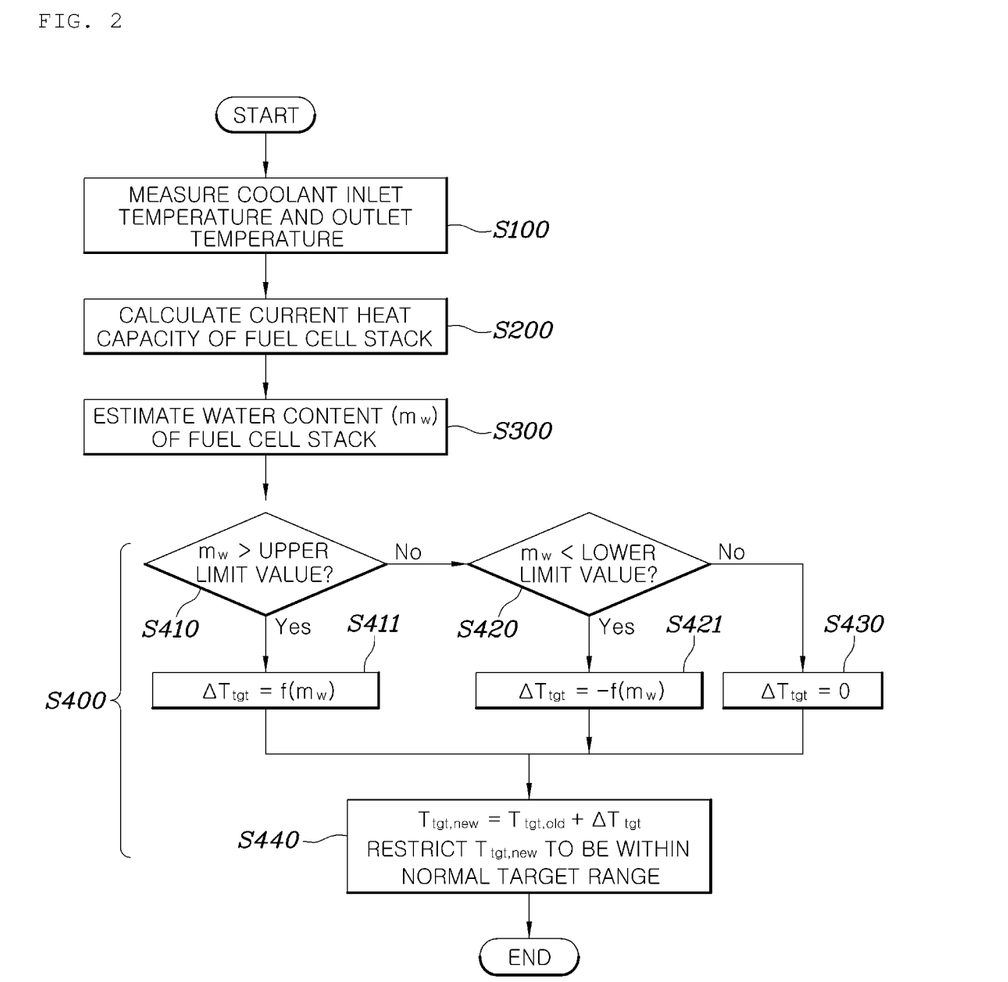
FIG. 2 is a flowchart showing a water content estimation method for a fuel cell according to an embodiment of the present disclosure.

FIG. 2 is a flowchart showing a water content estimation method for a fuel cell according to an embodiment of the present disclosure.

Referring to FIG. 2, a water content estimation method for a fuel cell according to an embodiment of the present disclosure includes the steps of measuring the temperature of the coolant for cooling the fuel cell stack 10 (S100), calculating the current heat capacity of the fuel cell stack 10 based on the measured temperature of the coolant (S200), and estimating the water content of the fuel cell stack 10 based on the calculated current heat capacity of the fuel cell stack 10 (S300).

Figure 3A:
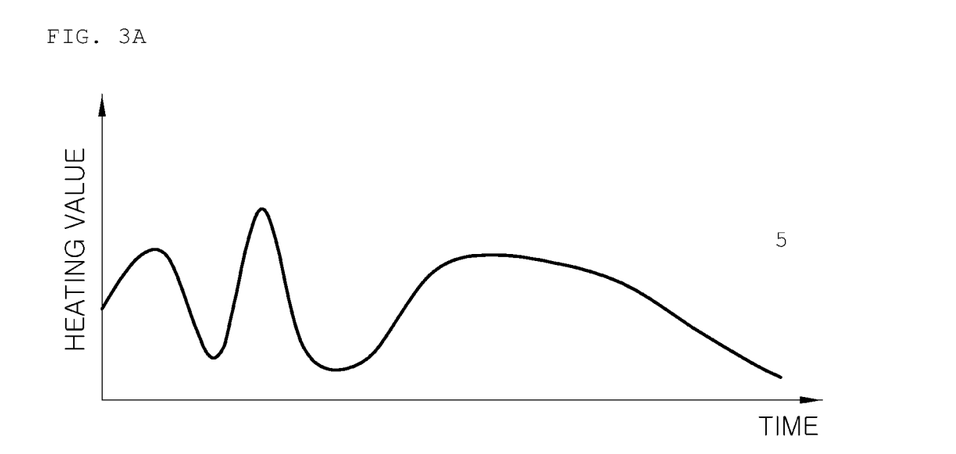
FIGS. 3A and 3B are views showing a coolant inlet temperature and a coolant outlet temperature in accordance with a change in a heating value of a fuel cell stack.
Figure 3B:
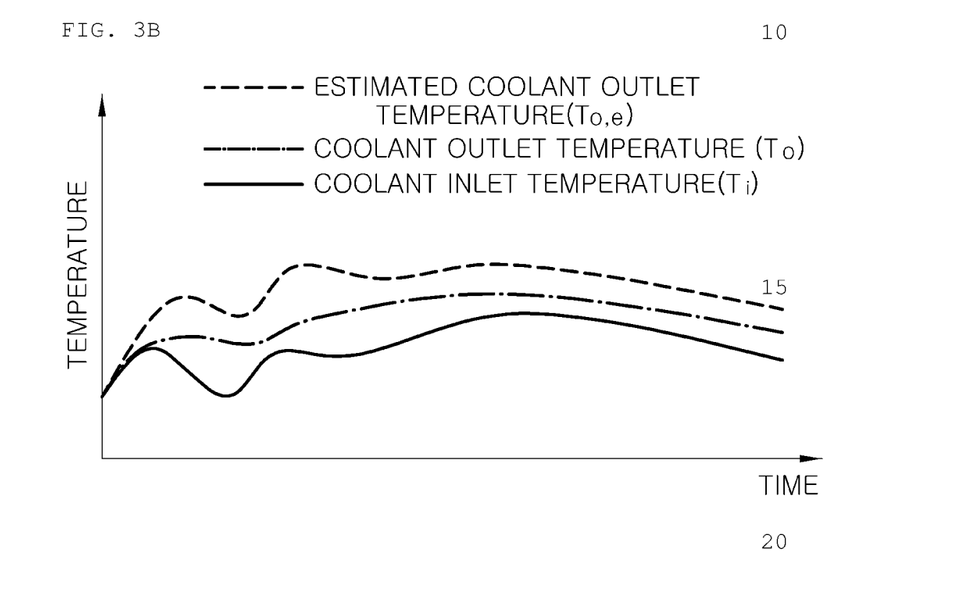

FIGS. 3A and 3B show the coolant inlet temperature and the coolant outlet temperature in accordance with a change in the heating value of the fuel cell stack 10.

Referring to FIGS. 3A and 3B, the outlet temperature of the coolant for cooling the fuel cell stack 10 may be estimated through an energy equation (the first law of thermodynamics) using the heating value of the fuel cell stack 10, the flow rate of the coolant, and the heat capacity of the fuel cell stack 10.

However, there is a big difference between the estimated coolant outlet temperature $T_{o,e}$ and the actual coolant outlet temperature $T_o$ measured by the temperature sensors 21 and 22. The reason for this is that the heat capacity of the fuel cell stack 10 varies depending on a change in the water content of the fuel cell stack 10. Therefore, the water content of the fuel cell stack 10 may be estimated by calculating the heat capacity of the fuel cell stack 10 that varies. In this direct and simple manner, the water content of the fuel cell stack 10 may be accurately estimated.

Specifically, in the step (S100) of measuring the temperature of the coolant, the coolant inlet temperature, which is the temperature of the coolant that is introduced into the fuel cell stack 10, and the coolant outlet temperature, which is the temperature of the coolant that is discharged from the fuel cell stack 10, may be measured.

That is, the coolant inlet temperature and the coolant outlet temperature are respectively measured using the temperature sensors 21 and 22, and a heat exchange rate between the fuel cell stack 10 and the coolant may be calculated using the difference between the coolant inlet temperature and the coolant outlet temperature.

In the step (S200) of calculating the current heat capacity of the fuel cell stack 10, the current heat capacity of the fuel cell stack 10 may be calculated using a heat exchange rate between the fuel cell stack 10 and the coolant, a heating value of the fuel cell stack 10 and variation in temperature of the fuel cell stack 10.

The heat exchange rate between the fuel cell stack 10 and the coolant is proportional to the difference between the coolant inlet temperature $T_i$ and the coolant outlet temperature $T_o$ and the flow rate of the coolant supplied to the fuel cell stack 10. Specifically, the heat exchange rate (based on the fuel cell stack 10) between the fuel cell stack 10 and the coolant may be calculated using the following equation.

$$\text{Heat Exchange Rate} = \dot{m}_c \cdot c_c \cdot (T_i - T_0)[\text{kcal/s}]$$

where, $\dot{m}_c$ is the flow rate of the coolant [kg/s], and $C_c$ is the specific heat of the coolant [kcal/kg·°C.]. The flow rate of the coolant may be measured by a flow rate sensor, which is disposed at the cooling pump 32 or at the inlet of the fuel cell stack 10.

The heating value $\dot{Q}_{gen}$[kcal/s] of the fuel cell stack 10 is a heating value of the fuel cell stack 10 over time, and may be calculated using the current and voltage output from the fuel cell stack 10. Alternatively, the heating value of the fuel cell stack 10 may be calculated by measuring the internal resistance of the fuel cell stack 10.

The variation in temperature dT/dt of the fuel cell stack 10 over time may be calculated by directly measuring the temperature of the fuel cell stack 10.

In another embodiment, the variation in temperature of the fuel cell stack 10 may be estimated using a variation in the coolant outlet temperature, which is the temperature of the coolant that is discharged from the fuel cell stack 10, measured in the step (S100) of measuring the temperature of the coolant. Specifically, the variation in temperature of the fuel cell stack 10 may be estimated to be equal to the variation in the coolant outlet temperature. Therefore, it is possible to easily estimate variation in the temperature of the fuel cell stack 10 over time, which is difficult to directly measure.

In the step (S200) of calculating the current heat capacity of the fuel cell stack 10, the energy equation (the first law of thermodynamics) may be used as follows.

$$C_{total} \cdot \frac{dT}{dt} = \dot{m}_c \cdot c_c \cdot (T_i - T_0) + \dot{Q}_{gen}$$

where, $C_{total}$ is the current heat capacity of the fuel cell stack 10 [kcal/° C.]. This equation may be converted as follows.

$$C_{total}(t) = \left(\dot{m}_c \cdot c_c \cdot (T_{i,t} - T_{o,t}) + \dot{Q}_{gen}\right) \cdot \frac{t_{sample}}{T_{o,t} - T_{o,t-1}}$$

where, t is the current time, and $t_{sample}$ is the sampling time of the temperature sensor.

The current heat capacity $C_{total}(t)$ of the fuel cell stack 10 may be calculated using the above equation.

In the step (S300) of estimating the water content of the fuel cell stack 10, the mass of water contained in the fuel cell stack 10 may be estimated on the assumption that the sum of the initial heat capacity in the state in which moisture is not contained in the fuel cell stack 10 and the heat capacity of water currently contained in the fuel cell stack 10 is the calculated current heat capacity of the fuel cell stack 10.

That is, it is assumed that the fuel cell stack 10 does not contain any other impurities, and only the stack itself and water are present. It is assumed that the current heat capacity $C_{total}(t)$ of the fuel cell stack 10 is the sum of the initial heat capacity ($C_{stack}$), which is the heat capacity of the fuel cell stack 10 in the initial state, in which moisture is not contained therein, and the heat capacity $C_w(t)$ of water currently contained in the fuel cell stack 10. Therefore, it may be expressed by the following equation.

$$C_{total}(t) = C_{stack} + C_w(t)$$

The above equation may be expressed as follows in consideration of the fact that the heat capacity is the product of mass and specific heat.

$$C_{total}(t) = m_{stack} \cdot c_{stack} + m_w(t) \cdot c_w$$

where, $C_{stack}$ is the initial specific heat of the fuel cell stack 10 [kcal/kg·° C.], and Cw is the specific heat of water [kcal/kg·° C.].

The initial mass $m_{stack}$ the fuel cell stack 10, the of initial specific heat $C_{stack}$ of the fuel cell stack 10 and the specific heat $C_w$ of water are constant, and are preset in advance through experimentation. Accordingly, the mass $m_w(t)$ of water currently contained in the fuel cell stack 10 may be calculated using the following equation.

$$m_w(t) = \frac{C_{total}(t) - m_{stack} \cdot c_{stack}}{c_w}$$

A water content control method for a fuel cell according to an embodiment of the present disclosure may include, after the step (S300) of estimating the water content of the fuel cell stack 10, adjusting the water content of the fuel cell stack 10 by controlling the temperature of the fuel cell stack 10 based on the estimated water content of the fuel cell stack 10 (S400).

Specifically, when the estimated water content of the fuel cell stack 10 is within the normal range, control may be performed such that the water content is maintained within the normal range (S430). When the estimated water content of the fuel cell stack 10 is out of the normal range (S410 and S420), the water content of the fuel cell stack 10 may be adjusted (S411 and S421). To this end, the temperature of the fuel cell stack 10 may be controlled by controlling the cooler 30.

Therefore, it is possible to control the water content of the fuel cell stack 10 so as to be maintained at an appropriate level, thereby improving the durability and power generation performance of the fuel cell stack 10.

As a method of controlling the temperature of the fuel cell stack 10, the flow rate of the coolant may be controlled by changing the rotation speed [rpm] of the cooling pump 32, or heat dissipation may be controlled by changing the rotation speed [rpm] of the cooling fan included in the heat-dissipating device 33 or controlling the electronic thermostat 31 to change the bypass flow rate.

In another embodiment, in order to increase the heating value of the fuel cell stack 10, a power generation controller (not shown) may perform control such that the power generation of the fuel cell stack 10 is increased.

In the step (S400) of adjusting the water content of the fuel cell stack 10, a target value $T_{tgt}$ of the coolant inlet temperature, which is the temperature of the coolant that is introduced into the fuel cell stack 10, may be changed based on the estimated water content of the fuel cell stack 10.

In particular, the cooling controller 50 may control the electronic thermostat 31 so that the coolant inlet temperature follows the target value $T_{tgt}$ of the coolant inlet temperature. That is, control may be performed such that the coolant inlet temperature reaches the target value $T_{tgt}$ of the coolant inlet temperature by changing the ratio at which the coolant that has passed through the heat-dissipating device 33 and the coolant that has bypassed the heat-dissipating device 33 are mixed with each other.

Specifically, in the step (S400) of adjusting the water content of the fuel cell stack 10, when the estimated water content of the fuel cell stack 10 is greater than a predetermined upper limit value (S410), the target value $T_{tgt}$ of the coolant inlet temperature is increased (S411). When the estimated water content of the fuel cell stack 10 is less than a predetermined lower limit value (S420), the target value $T_{tgt}$ of the coolant inlet temperature may be decreased (S421).

That is, when the estimated water content of the fuel cell stack 10 is greater than the predetermined upper limit value (S410), the variation $\Delta T_{tgt}$ in the target value of the coolant inlet temperature may be set to a positive value (S411). When the estimated water content of the fuel cell stack 10 is less than the predetermined lower limit value (S420), the variation $\Delta T_{tgt}$ in the target value of the coolant inlet temperature may be set to a negative value (S421).

On the other hand, in the step (S400) of adjusting the water content of the fuel cell stack 10, when the estimated water content of the fuel cell stack 10 is within the normal range, that is, is equal to or less than the predetermined upper limit value and equal to or greater than the predetermined lower limit value, the variation $\Delta T_{tgt}$ in the target value of the coolant inlet temperature may be set to 0 (S430).

That is, the normal range of the water content of the fuel cell stack 10 is a range between the predetermined upper limit value and the predetermined lower limit value, and when the estimated water content of the fuel cell stack 10 is within the normal range, the target value $T_{tgt}$ of the coolant inlet temperature may not be changed.

Figure 4:
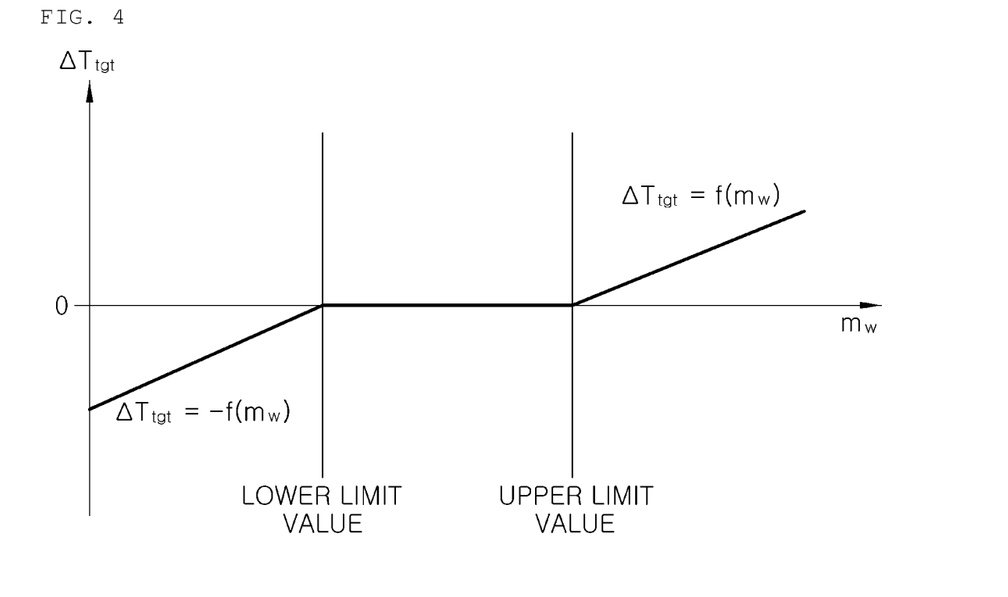
FIG. 4 is a graph showing variation in the target value of the coolant inlet temperature according to an embodiment of the present disclosure.

FIG. 4 is a graph showing variation in the target value of the coolant inlet temperature according to an embodiment of the present disclosure.

Referring to FIG. 4, as an embodiment of setting the variation $\Delta T_{tgt}$ in the target value of the coolant inlet temperature, in the step (S400) of adjusting the water content of the fuel cell stack 10, the variation $\Delta T_{tgt}$ in the target value of the coolant inlet temperature may be increased or decreased in proportion to the difference between the estimated water content of the fuel cell stack 10 and the predetermined upper or lower limit value. That is, the variation $\Delta T_{tgt}$ in the target value of the coolant inlet temperature may be set by the value of a function $f(m_w)$, which increases in proportion to the difference between the estimated water content $m_w$ of the fuel cell stack 10 and the predetermined upper or lower limit value.

Specifically, when the estimated water content of the fuel cell stack 10 is greater than the predetermined upper limit value, the variation $\Delta T_{tgt}$ in the target value of the coolant inlet temperature is increased ($f(m_w)$). When the estimated water content of the fuel cell stack 10 is less than the predetermined lower limit value, the variation $\Delta T_{tgt}$ in the target value of the coolant inlet temperature may be decreased ($-f(m_w)$).

As shown in FIG. 4, in the range where the estimated water content of the fuel cell stack 10 is greater than the predetermined upper limit value or less than the predetermined lower limit value, the variation $\Delta T_{tgt}$ in the target value of the coolant inlet temperature may be linearly proportional to the estimated water content of the fuel cell stack 10 ($f(m_w)$).

As the temperature in the fuel cell stack 10 is raised by increasing the target value of the coolant inlet temperature, the saturated water vapor pressure in the fuel cell stack 10 is increased, and water in the fuel cell stack 10 is discharged in a vapor state. In this manner, the water content of the fuel cell stack 10 may be controlled so as to be decreased.

On the other hand, as the temperature in the fuel cell stack 10 is lowered by decreasing the target value of the coolant inlet temperature, the saturated water vapor pressure in the fuel cell stack 10 is decreased, and vapor accumulates in the fuel cell stack 10 in the state of water droplets. In this manner, the water content of the fuel cell stack 10 may be controlled so as to be increased.

Figure 5:
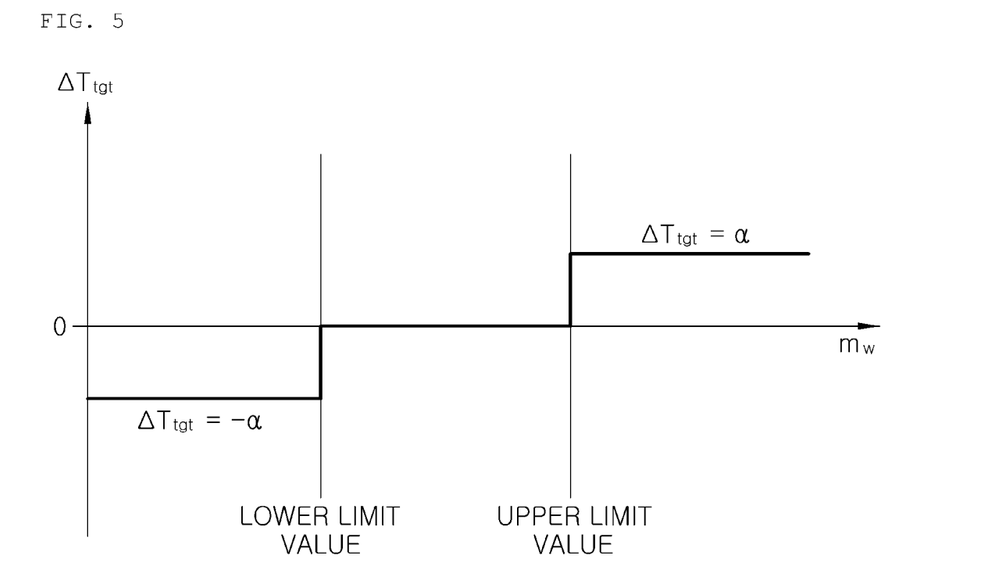
FIG. 5 is a graph showing variation in the target value of the coolant inlet temperature according to another embodiment of the present disclosure.

FIG. 5 is a graph showing variation in the target value of the coolant inlet temperature according to another embodiment of the present disclosure.

Referring to FIG. 5, as another embodiment of setting the variation $\Delta T_{tgt}$ in the target value of the coolant inlet temperature, in the step of adjusting the water content of the fuel cell stack 10, the variation in the target value of the coolant inlet temperature may be fixed to a predetermined fixed value $\alpha$.

That is, the variation $\Delta T_{tgt}$ in the target value of the coolant inlet temperature is constant as a fixed value $\alpha$ irrespective of the difference between the estimated water content of the fuel cell stack 10 and the predetermined upper or lower limit value.

When the water content of the fuel cell stack 10 is within the normal range between the predetermined upper limit value and the predetermined lower limit value, the variation $\Delta T_{tgt}$ in the target value of the coolant inlet temperature may be fixed to 0.

When the water content of the fuel cell stack 10 is greater than the predetermined upper limit value, the variation $\Delta T_{tgt}$ in the target value of the coolant inlet temperature may be fixed to a positive fixed value a so that the target value $T_{tgt}$ of the coolant inlet temperature is increased.

When the water content of the fuel cell stack 10 is less than the predetermined lower limit value, the variation $\Delta T_{tgt}$ in the target value of the coolant inlet temperature may be fixed to a negative fixed value $-\alpha$ so that the target value Ttgt of the coolant inlet temperature is decreased.

In the step (S400) of adjusting the water content of the fuel cell stack 10, the varied target value $T_{tgt,new}$ of the coolant inlet temperature may be limited within a predetermined normal target range (S440).

That is, the varied target value $T_{tgt,new}$ of the coolant inlet temperature, which is obtained by adding the variation $\Delta T_{tgt}$ in the target value of the coolant inlet temperature to the target value $T_{tgt,old}$ of the coolant inlet temperature, may be limited within the normal target range in the final step.

The predetermined normal target range may be preset experimentally in consideration of the cooling efficiency of the coolant for cooling the fuel cell stack 10. Therefore, it is possible to improve the robustness of the control system and method for cooling the fuel cell stack 10 by restricting the target value of the coolant inlet temperature to be within the normal target range in the final step.

As is apparent from the above description, the present disclosure provides a method and system for estimating and controlling the water content of a fuel cell, which may estimate the water content of a fuel cell stack in real time in a direct and simple manner without complicated calculation processes or experimentation.

In addition, it is possible to maintain appropriate water content of a fuel cell stack by changing the temperature of the fuel cell stack based on the estimated water content of the fuel cell stack, and accordingly the power generation performance and durability of the fuel cell may be improved.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A water content estimation method for a fuel cell, the method comprising steps of:
   measuring, by a temperature sensor, a temperature of coolant for cooling a fuel cell stack; calculating, by a water amount calculator, a current heat capacity of the fuel cell stack based on the measured temperature of coolant; and
   determining, by the water amount calculator, a water amount maintained inside the fuel cell stack based on the calculated current heat capacity of the fuel cell stack,
   wherein, in the step of calculating, the current heat capacity of the fuel cell stack is calculated using a heat exchange rate between the fuel cell stack and coolant, a heating value of the fuel cell stack, and a variation in temperature of the fuel cell stack,
   wherein, in the step of determining, a mass of water contained in the fuel cell stack is determined when a sum of an initial heat capacity in a state in which moisture is not contained in the fuel cell stack and a heat capacity of water currently contained in the fuel cell stack is the calculated current heat capacity of the fuel cell stack.

2. The water content estimation method claim 1, wherein, in the step of measuring, a coolant inlet temperature of coolant, which is introduced into the fuel cell stack, and a coolant outlet temperature of coolant, which is discharged from the fuel cell stack, are measured.

3. The water content estimation method according to claim 1, wherein the variation in temperature of the fuel cell stack is determined using a variation in a coolant outlet temperature of coolant that is discharged from the fuel cell stack.

4. A water content control method for a fuel cell using the water content estimation method according to claim 1, the water content control method comprising, after the step of determining, a step of adjusting, by a cooling controller, the water amount maintained inside the fuel cell stack by controlling a temperature of the fuel cell stack based on the determined water amount maintained inside the fuel cell stack.

5. The water content control method according to claim 4, wherein, in the step of adjusting, a target value of a coolant inlet temperature of coolant, which is introduced into the fuel cell stack, is changed based on the estimated water amount maintained inside the fuel cell stack.

6. The water content control method according to claim 5, wherein, in the step of adjusting,
when the determined water amount maintained inside the fuel cell stack is greater than an upper limit value, the target value of the coolant inlet temperature is increased, and
when the determined water amount maintained inside the fuel cell stack is less than a lower limit value, the target value of the coolant inlet temperature is decreased.

7. The water content control method according to claim 5, wherein, in the step of adjusting, when the determined water amount maintained inside the fuel cell stack is within a normal range between an upper limit value and a lower limit value, a variation in the target value of the coolant inlet temperature is set to 0 (zero).

8. The water content control method according to claim 6, wherein, in the step of adjusting, a variation in the target value of the coolant inlet temperature is increased or decreased in proportion to a difference between the determined water amount maintained inside the fuel cell stack and the upper limit value or the lower limit value.

9. The water content control method according to claim 6, wherein, in the step of adjusting, a variation in the target value of the coolant inlet temperature is set to a fixed value.

10. The water content control method according to claim 5, wherein, in the step of adjusting, a varied target value of the coolant inlet temperature is limited within a normal target range.

11. A water content estimation system for a fuel cell, the system comprising: a fuel cell stack; a cooler for circulating coolant for cooling the fuel cell stack; a temperature sensor for measuring a temperature of coolant in the cooler; and a water amount calculator configured to calculate a current heat capacity of the fuel cell stack based on the temperature of coolant measured by the temperature sensor, and to determine a water amount maintained inside the fuel cell stack based on the calculated current heat capacity of the fuel cell stack, wherein the water amount calculator is configured to calculate the current heat capacity of the fuel cell stack using a heat exchange rate between the fuel cell stack and coolant a flow rate of the coolant supplied to the fuel cell stack from the cooler, and a heating value of the fuel cell stack, wherein the water amount calculator is configured to determine a mass of water contained in the fuel cell stack when a sum of an initial heat capacity in a state in which moisture is not contained in the fuel cell stack and a heat capacity of water currently contained in the fuel cell stack is the calculated current heat capacity of the fuel cell stack.

12. A water content control system for a fuel cell using the water content estimation system according to claim 11, the water content control system comprising:
a cooling controller configured to adjust the water amount maintained inside the fuel cell stack by controlling the cooler based on the water amount maintained inside the fuel cell stack determined by the water amount calculator.

* * * * *